(12) United States Patent  (10) Patent No.: US 6,477,572 B1
Elderton et al.  (45) Date of Patent: Nov. 5, 2002

(54) METHOD FOR DISPLAYING A NETWORK TOPOLOGY FOR A TASK DEPLOYMENT SERVICE

(75) Inventors: John Elderton, Austin, TX (US); Ronald L. Heiney, Longmont, CO (US); Kevin Thomas McDonald, Austin, TX (US); Mike Moran, Austin, TX (US); Joseph Laurence Saunders, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,841

(22) Filed: Dec. 17, 1998

(51) Int. Cl.[7] .............................................. G06F 13/00
(52) U.S. Cl. ...................................................... 709/224
(58) Field of Search ................................. 709/200–253

(56) References Cited

U.S. PATENT DOCUMENTS

| | | | | |
|---|---|---|---|---|
| 5,276,789 A | * | 1/1994 | Besaw et al. | |
| 5,295,244 A | | 3/1994 | Dev et al. | |
| 5,559,955 A | | 9/1996 | Dev et al. | |
| 5,768,552 A | * | 6/1998 | Jacoby | |
| 5,948,058 A | * | 9/1999 | Pulsipher et al. | |
| 6,108,702 A | * | 8/2000 | Wood | 709/224 |

* cited by examiner

*Primary Examiner*—David Wiley
(74) *Attorney, Agent, or Firm*—Duke W. Yee; Jeffrey S. LaBaw; Stephen R. Tkacs

(57) ABSTRACT

A method for displaying a network topology begins by presenting a user a set of attributes for network objects in the network. The user the selects a given attribute and an attribute value. A mapper routine of the invention then builds a topology map that includes at least one icon representing network objects that have the user-selected attribute value for the attribute. This "group" icon preferably includes a numeric, textual or graphical representation to indicate the number of objects (or perhaps some given characteristic thereof) represented by the group icon.

20 Claims, 5 Drawing Sheets

METHOD FOR DISPLAYING A NETWORK TOPOLOGY FOR A TASK DEPLOYMENT SERVICE

BACKGROUND OF THE INVENTION

1. Technical Field

The present invention is directed to managing a large distributed computer enterprise environment and, more particularly, to generating a network topology display to facilitate application deployment in such an environment.

2. Description of the Related Art

Enterprises now desire to place all of their computing resources on a computer network. To this end, it is known to connect computers in a large, geographically-dispersed network environment and to manage such an environment in a distributed manner. One such management framework, known as the Tivoli Managed Environment™, consists of a server that manages a number of nodes, each of which has a local object database that stores object data specific to the local node. Each managed node typically includes a management framework, comprising a number of management routines, that is capable of a relatively large number (e.g., hundreds) of simultaneous network connections to remote machines. The framework manages hundreds of megabytes of local storage and can spawn many dozens of simultaneous processes to handle method requests from local or remote users. Of these nodes, only a small percentage are file servers, name servers, database servers, or anything other than end-of-wire or so-called "endpoint" machines. The majority of the network machines are simple personal computers (PCs) or workstations.

It is known in the art to generate and display a graphical representation or "map" of the various network objects or object types that comprise such a managed environment. Typically, a submap (namely, a given portion of the overall network topology map) displays a set of symbols and connections. The symbols depict various network objects, e.g., servers, managed nodes, gateways, endpoints, repeaters, and the like, located within a managed region or across a set of managed regions. At a high level, an initial map of the managed environment (with multiple managed regions and their respective managed resources) might well show over 250 symbols and connections per server. The processing of the information necessary to display such a topology map is quite CPU intensive and, thus, the map itself takes several minutes to render, even on a relatively high-powered workstation. Moreover, the large amount of densely displayed information makes the map difficult to read and interpret.

As a result, such known topology display techniques have proven less than satisfactory as tools for planning and managing software deployments in the network. The present invention addresses this deficiency.

BRIEF SUMMARY OF THE INVENTION

It is an object of this invention to provide a unique graphical representation of a network topology.

It is another object of this invention to simplify the display of a complex network topology into a graphical representation that is useful as a tool for planning and managing software deployments in a large, distributed computing environment.

It is yet another object of the invention to enable a system administrator to render information in a network topology map in a more efficient and useful manner.

Still another object of the present invention is to provide a method of displaying information in a network topology map according to network object attributes, as opposed to mere physical connections between objects.

A more general object of this invention is to simplify the process of generating a network topology map while, at the same time, providing a map with more useful management information.

A method for displaying a network topology begins by presenting a user a set of attributes for network objects in the network. The user the selects a given attribute and an attribute value. A mapper routine of the invention then builds a topology map that includes at least one icon representing network objects that have the user-selected attribute value for the attribute. This "group" icon preferably includes a numeric, textual or graphical representation to indicate the number of objects (or perhaps some given characteristic thereof) represented by the group icon.

A set of display rules is useful for selecting network objects with like attributes to be displayed as a grouping by the icon. Using the display rules, a user may view a collection of objects as a single icon according to some physical or logical characteristic. For example, one grouping is that the objects comprising the icon share a given operating system type, a given application program or version, a given location, or the like.

According to another aspect of the invention, a display method is executable in a computer system having a processor and a display device. Preferably, the method is implemented in software. In particular, the method comprises steps executable in the processor for compiling information about the computer network and then displaying a network topology map with a plurality of icons. A given icon in the network topology map represents a set of network objects grouped according to a user-selected attribute value. The icon preferably includes a numeric, textual or graphical representation to indicate the number objects represented by the icon. A 3-dimensional icon may also be used to represent the grouping.

The present invention also describes a task deployment planning method operative in a distributed computer enterprise environment. The method begins discovering attribute values of a plurality of network objects. These attribute values are then stored in a database. In response to a user selection, the routine then builds and displays a topology map for use in planning the task deployment. The map includes at least one icon or symbol representing a set of network objects grouped according to a user-selected attribute value.

A task deployment method is also provided by the present invention. The method begins by discovering attribute values of a plurality of network objects and storing the attribute values in a database. In response to a user selection, the routine displays a topology map with at least one icon representing a grouping of network objects according to a user-selectable attribute value. The user then initiates the task deployment.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
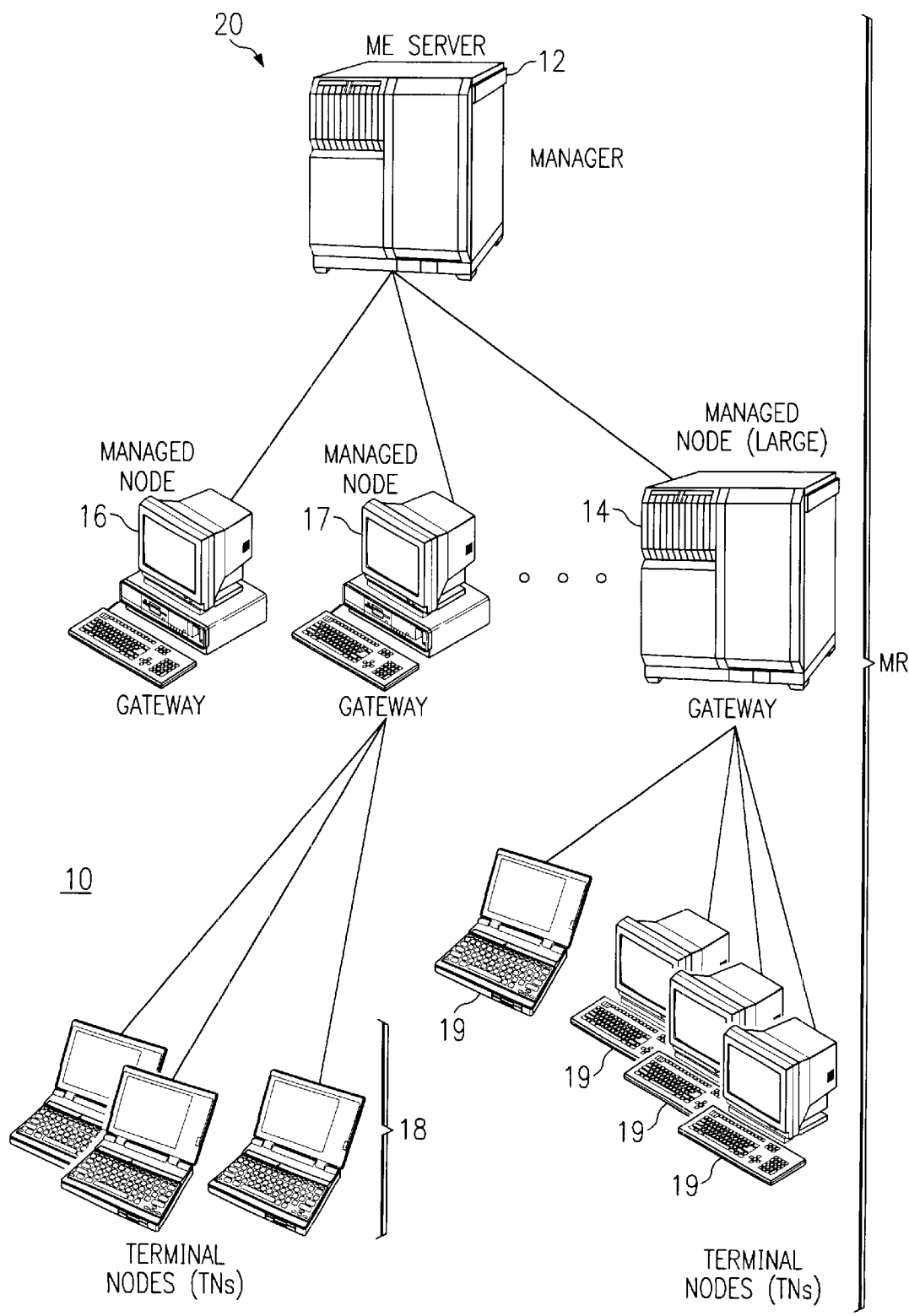
FIG. 1 illustrates a simplified diagram showing a large distributed computing enterprise environment in which the present invention is implemented.

Referring now to FIG. 1, the invention is preferably implemented in a large distributed computer environment 10 comprising up to thousands of "nodes". The nodes typically are geographically dispersed and the overall environment is said to be "managed" in a distributed manner. Preferably, the management environment (ME) is broken down logically into a series of loosely-connected managed regions (MR), each with its own management server 12 for managing local resources within the MR. The network typically includes other servers (not shown) for carrying out other distributed network functions. These include name servers, security servers, file servers, thread servers, time servers and the like. Multiple servers 12 coordinate activities across the enterprise and permit remote site management and operation. Each server 12 serves a number of gateway machines 14, 16 and 17, each of which in turn support a plurality of endpoints 18 and 19. In this configuration, gateway 14 also is a server. Server 12 preferably coordinates all activity within the MR.

Servers 12 and 14 provide network resources such as data storage space, application services and many other services known to be provided by servers in a network. Preferably, the servers 12 and 14 are computers including a IBM RS/6000® processor running the AIX operating system, preferably version 3.2.5 or greater. Suitable alternative machines include an IBM-compatible PC x86 or higher running Windows NT® or LINUX, a Data General AViion® series running DG/UX version 4.2, SCO UnixWare® 2.1 or greater, a Hewlett Packard 9000/700 or 800 series running HP UX 9.0 or greater, a Compaq AlphaServer® running Digital UNIX or Windows NT, or a Sun Enterprise 10000 series running Solaris® 7. Of course, other machines and/or operating systems may be used as well for the server machines.

Workstations 16, 17 and 19 are connected directly to the network using known techniques such as Ethernet networks, token ring networks, and the like. Wireless connections may also be used. Workstations 16, 17 and 19 are preferably IBM-compatible x86 personal computers running IBM OS/2®, Windows® 98 or NT®. Alternative Unix based workstations produced by IBM, Sun, Hewlett-Packard and others may be used as well. In this illustrative example, workstation 17 serves as a dial-up server for laptop computers 18. This provides convenient access for mobile users. Laptop computers 18 are preferably x86 based machines such as the IBM Thinkpad® series running a suitable operating system such as IBM OS/2® or Windows® 98. A representative endpoint includes a Web browser.

Figure 2:
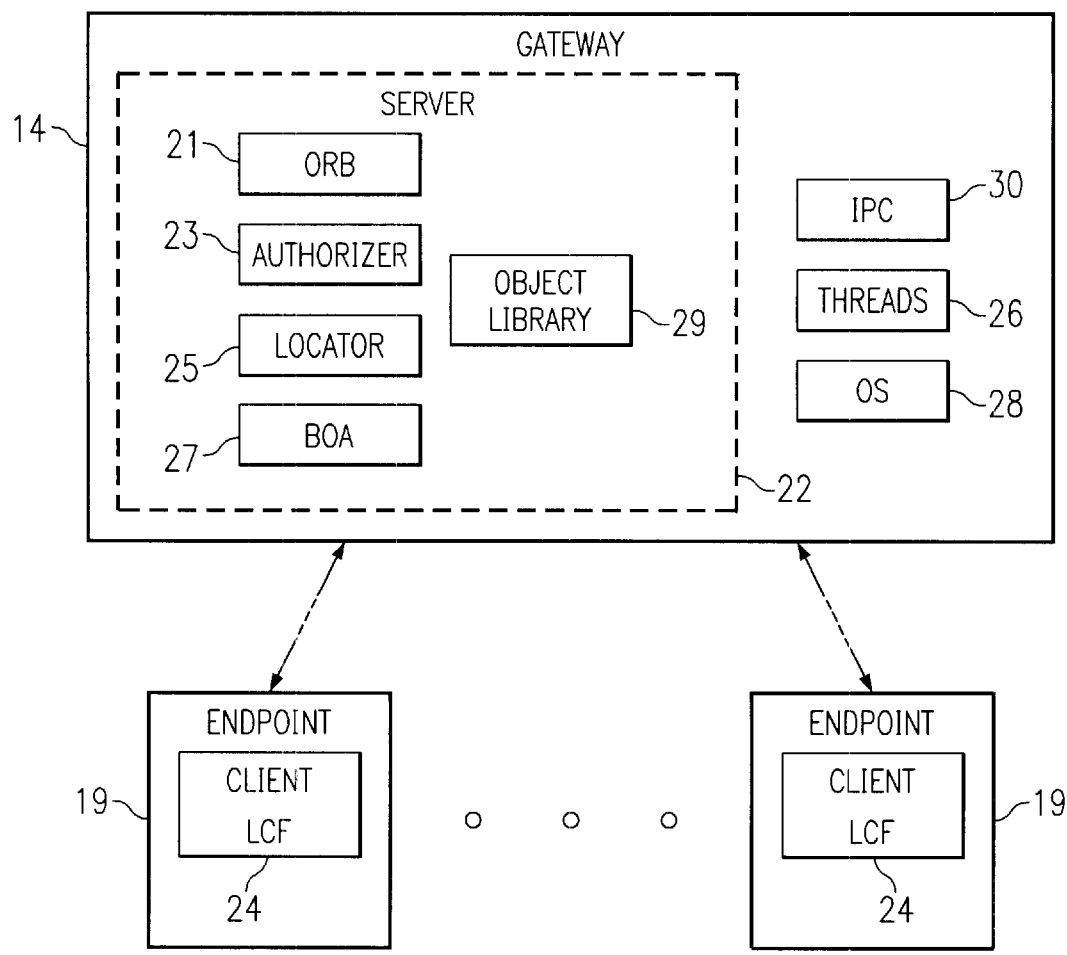
FIG. 2 is a block diagram of a preferred system management framework illustrating how the framework functionality is distributed across the gateway and its endpoints within a managed region.

Referring now to FIG. 2, each gateway machine, such as server 14, preferably runs a server component 22 of a system management framework. The server component 22 is a multi-threaded runtime process that comprises several components: an object request broker or "ORB" 21, an authorization service 23, object location service 25 and basic object adapter or "BOA" 27. Server component 22 also includes an object library 29. Preferably, the ORB 21 runs continuously, separately from the operating system, and communicates with both server and client processes through separate inter-process communication (IPC) facilities 30. In particular, a secure remote procedure call (RPC) is used to invoke operations on remote objects. Gateway server 14 also includes an operating system 28 and a threads mechanism 26.

Figure 3:
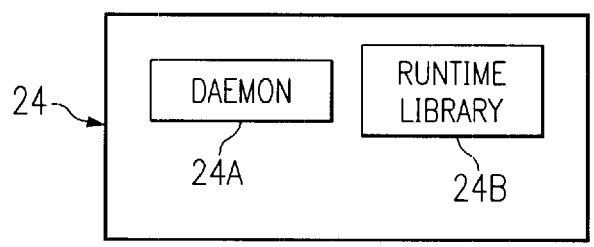
FIG. 3 is a block diagram of the elements that comprise the LCF client component of the system management framework.

The system management framework preferably includes a client component 24 supported on each of the endpoint machines, such as workstations 19. The client component 24 preferably is "dataless" in the sense that the system management data is not cached or stored there in a persistent manner. This is a known product called the Tivoli lightweight client framework ("LCF"). The LCF has two main parts as illustrated in FIG. 3: the LCF daemon 24a and an application runtime library 24b. The LCF daemon 24a is responsible for endpoint log-in and for spawning application endpoint executables. Once an executable is spawned, the LCF daemon 24a has no further interaction with it. Each executable is linked with the application runtime library 24b, which handles all further communication with the gateway. The runtime library typically includes a query agent that is started upon receipt of a management query and then is used to effectuate a given management operation.

Implementation of the management framework in this "client-server" manner has significant advantages, and it facilitates the connectivity of personal computers into the managed environment. Using an object-oriented approach, the system management framework facilitates execution of system management tasks required to manage the resources in the MR. Such tasks are quite varied and include, without limitation, file and data distribution, network usage monitoring, user management, printer or other resource configuration management, and the like.

Figure 4:
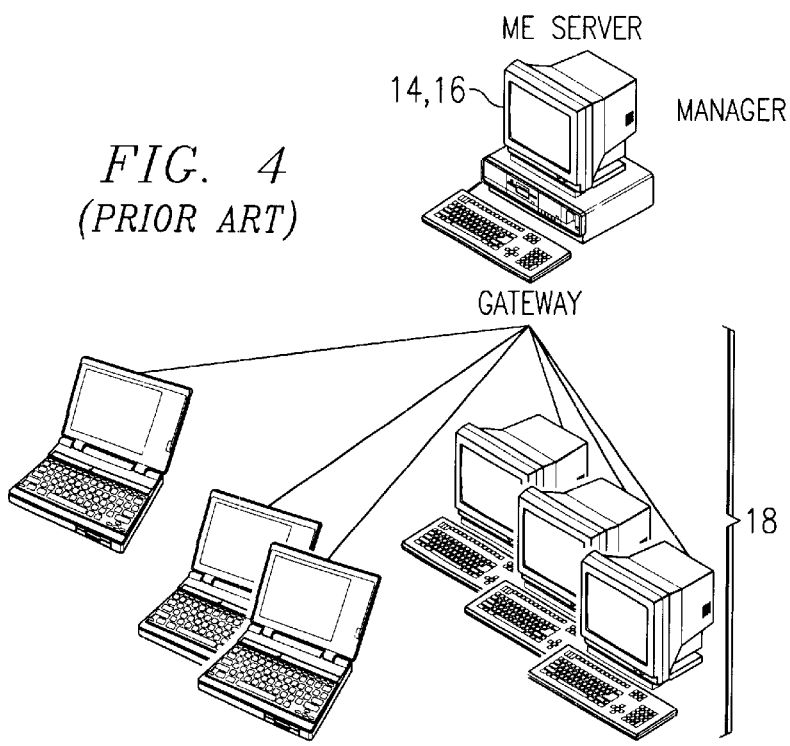
FIG. 4 illustrates a smaller "workgroup" implementation of the enterprise in which the server and gateway functions are supported on the same machine.

In the large enterprise such as illustrated in FIG. 1, preferably there is one server per MR with some number of gateways. For a workgroup-size installation (e.g., a local area network) such as illustrated in FIG. 4, a single serverclass machine may be used as the server and gateway, and the client machines run the lightweight client framework (LCF) as previously described. References herein to a distinct server and one or more gateway(s) should thus not be taken by way of limitation, as these elements may be combined into a single platform. For intermediate size installations, the MR grows breadth-wise with additional gateways being used to balance the load of the end points.

The server is the top-level authority over all gateways and endpoints. In particular, the server maintains an endpoint list, which keeps track of every endpoint in a managed region. The list preferably contains all information necessary to uniquely identify and manage each endpoint including, without limitation, such information as name, location, and machine type. The server also maintains the mapping between each endpoint and gateway, and this mapping is preferably dynamic. As noted above, there are one or more gateways per managed region. Preferably, a gateway is a fully-managed node that has been configured to operate a gateway. As endpoints log in, the gateway builds an endpoint list for its endpoints. The gateway's duties preferably include: the setting for endpoint log-in requests, the setting for endpoint update requests, and (its main task) acting as a gateway for method invocations on endpoints.

Given management operations in the managed environment may be carried out by "agents". An agent is a specialized low-impact software module or routine that is deployed to a client node and that is useful for executing some local management task. Thus, for example, the management server may include a discovery mechanism that provides automatic discovery of managed nodes, gateways and connected managed regions. The mechanism deploys the software agents, which identify information about managed devices and make it available to a network managing system.

The above-described framework is a known end-to-end, cross-platform network management scheme that provides a core set of management services and various management applications. One important management application is software distribution. In particular, software is installed on remote workstations using so-called file packages. Typically, software distribution involves copying a set of files from a management server to the distribution endpoints and then executing an installation/configuration script that makes the appropriate changes to the local system configuration files in batch mode.

Figure 5:
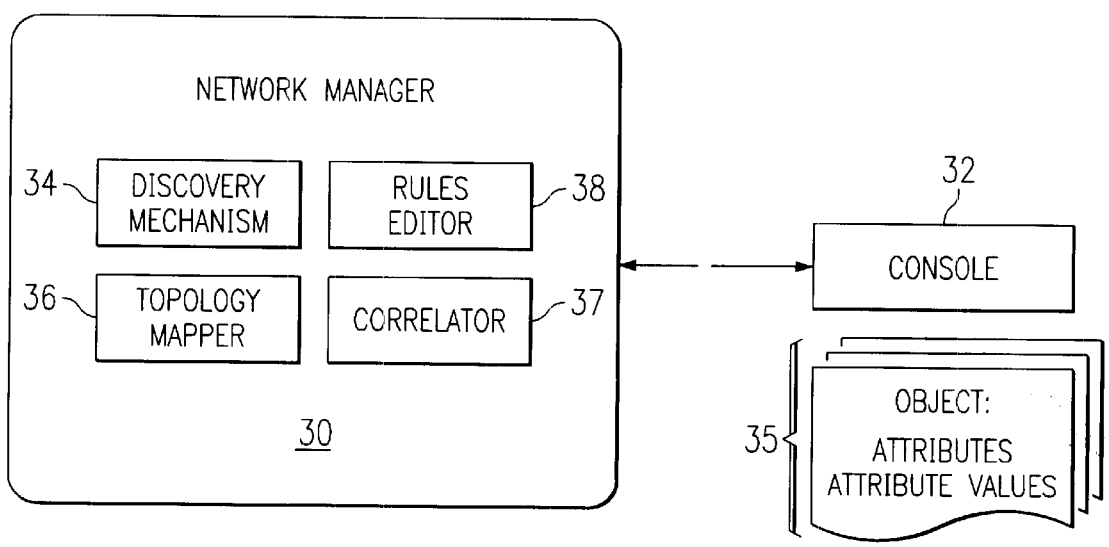
FIG. 5 is a network manager for use in managing the distributed computing enterprise environment.

Referring now to FIG. 5, a network manager 30 is provided to enable a system administrator to monitor the health of the network through a centralized console 32, launch network applications from various views of the network, respond to alerts and event conditions occurring in the network, and set policy for consistent management across enterprise networks. Preferably, the network manager 30 may be configured and controlled from any desktop in a given management region (MR), e.g., using a Web browser interface.

The network manager comprises a number of basic components. A discovery mechanism 34 provides automatic discovery of managed nodes, gateways and connected managed regions. In a representative embodiment, such discovery is carried out using agents that access information about managed devices (which maintain values for a number of variables) and make it available to the network manager. A representative discovery mechanism of this type is described in more detail in Ser. No. 09/089,961, titled "System, Method And Computer Program Product For Discovery In A Distributed Computing Environment." That application is assigned to the assignee of the present invention and is incorporated herein by reference.

The network manager also includes a topology mapper 36, which receives inputs from the discovery module and uses this information to build and display unique network topology maps according to the present invention. Such maps preferably include at least one icon or symbol that represents a unique grouping of network objects, as will be described. As seen in FIG. 5, the network manager also includes a correlation manager 37, which is used to define event correlation and automated responses. Management policies may be implemented in the form of rules using a rules editor 38. Rules editor 38 may also be used to enable a user to define rules for determining what information is included in the topology map.

According to the present invention, a network resource located at a node is sometimes referred to as an object. An "attribute" is a given characteristic of the node that is useful in facilitating a network management operation, e.g., a software deployment. Thus, for example, an attribute is an operating system type, available disk space, the identity of installed software versions, whether the object is enabled through the management framework, the identity and characteristics of the subnet within which the node is operating, the identity of the router to which the object is connected, and the like. A given attribute has an attribute "value". Thus, for example, if the attribute is operating system type, the attribute value may be AIX, UNIX, Windows NT, Windows '98, or the like. According to the invention, a "grouping" is a set of nodes or objects that have a common attribute or attribute value. A group "icon" or symbol is a symbolic representation of a set of network objects that are grouped according to an attribute value, as will be seen.

The attribute values are collected by the discovery mechanism and stored in the database 35. For example, in response to request by a system administrator, the discovery mechanism launches the discovery agents, and these agents return a list of IP addresses and hostnames in the managed environment. For a given node, the discovery agents also identify and return attribute values. Although a discovery mechanism is preferred, other techniques (e.g., request-response protocols) may be used to collect the network configuration data.

As will be seen, the topology mapper 36 enables the system administrator to dynamically group resources by a common characteristic. In particular, the topology mapper 36 preferably displays user-defined groupings, preferably with special icons, to facilitate task deployment planning within the large managed region.

Figure 6:
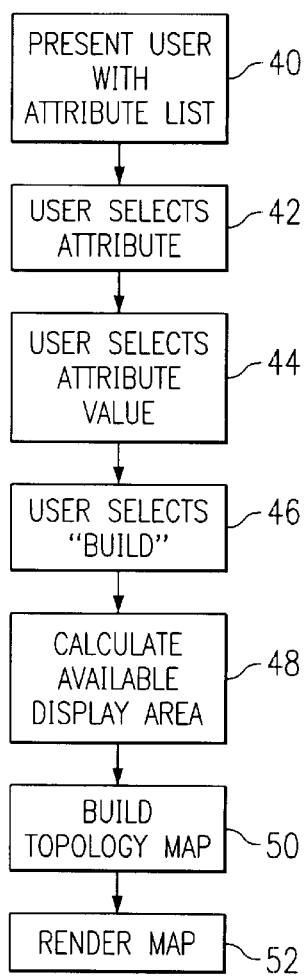
FIG. 6 is a flowchart of a preferred display routine of the present invention.
Figure 7:
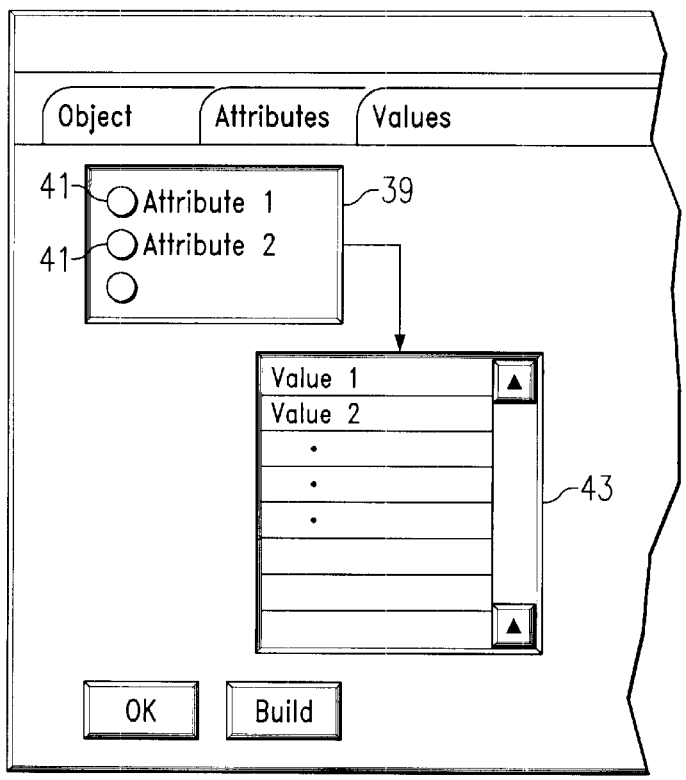
FIG. 7 is a dialog panel useful for selecting object attributes and attribute values for the mapping function.

A routine for accomplishing the topology generation and mapping function is illustrated in FIG. 6. The display routine assumes that the discovery mechanism has been completed and the attribute values are stored in the database. The discovery process itself may be initiated via a graphical user interface display panel that includes appropriate menus and options to enable the user to identify the particular attributes (and their associated attributes) for discovery. A representative display panel dialog is illustrated in FIG. 7, although any convenient method or mechanism may be used to interact with the user. Thus, for illustrative purposes, the routine of FIG. 6 begins at step 40 by presenting the administrator with a set of attributes 39 for network objects in the network. At step 42, the user identifies an attribute, e.g., operating system type, by selecting an appropriate GUI element, such as radio button 41. This step causes a listbox 43 to be populated with the available attribute values (as determined by information in the database). At step 44, the user selects a given attribute value, e.g., by highlighting the value in the listbox and selecting "OK" 45. At step 46, the user may select "Build" 47 to initiate generation of the topology map based on the selected attribute value. At step 48, the display routine then determines the size of the user's display screen and the display resolution selected for the console. At step 50, the routine builds the topology map with at least one icon representing a set of network objects grouped according to the selected attribute value. At step 52, the routine renders the topology map according to the amount of screen "real estate" and the user-selected attribute value grouping. This completes the basic mapping function.

Figure 8:
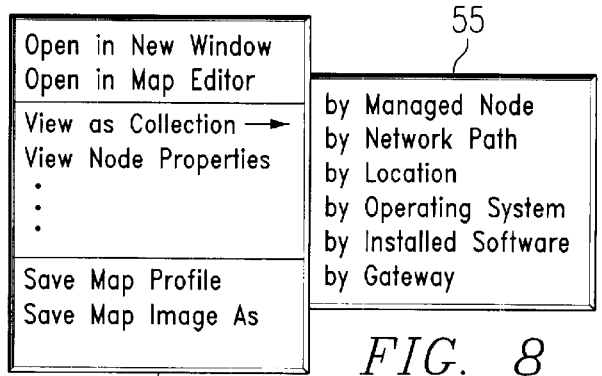
FIG. 8 is an alternative GUI display menu that enables a user to select a given "collection" of objects to be displayed as a group according to the present invention.

According to another aspect of the invention, a user is provided with the capability of applying one or more display rules to a topology map. Such display rules enable the user to view a selected set of network objects as an icon, and in real-time (i.e. without having to rediscover and/or recompile information necessary to build the map in the first instance). Thus, after the initial map data is compiled, the user may select to view a collection of objects according to one or more display rules, such as: "by managed node", "by network path", "by location", "by operating system", by "installed software" and "by gateway", for example. Two or more rules may be joined by logical operators to provide an even finer degree of control. A user may create a custom rule, e.g., "by accounting department" or the like. FIG. 8 illustrates an GUI display menu that a user may select, e.g., by right-clicking mouse, to provide this functionality. In this embodiment, the user pulls down a menu 53 and selects a "View as Collection" property. This causes a submenu 55 to be displayed. The submenu 55 includes the display rules that are then available for selection. A given rule may then be used to access (e.g., via a mouseover) its own additional submenu to further refine the selection. The display rules may be used as an adjunct to or in lieu of selecting particular attribute values.

With real-time display of user-selected object groupings, the present invention is quite useful in facilitating task deployment planning. Using the mapper, the system administrator can group symbols of like attributes and then evaluate the amount the bandwidth required for the operation. By using the "View as Collection" function, one or more different views of the network are readily displayed. With this tool, management decisions may be made in real-time, because the administrator can view then-current network configurations, resources and loads.

More generally, the inventive technique provides a way to represent a large number of managed resources with a much smaller set of symbols per managed region server. The administrator may then readily select which nodes are to receive the deployment. The administrator then configures a task for deployment. Once the target nodes have been identified, the task is deployed to these machines. The deployment thus is focused to only those regions of the managed network that are required to receive the task. This greatly reduces bandwidth and thereby conserves network resources.

Figure 9:
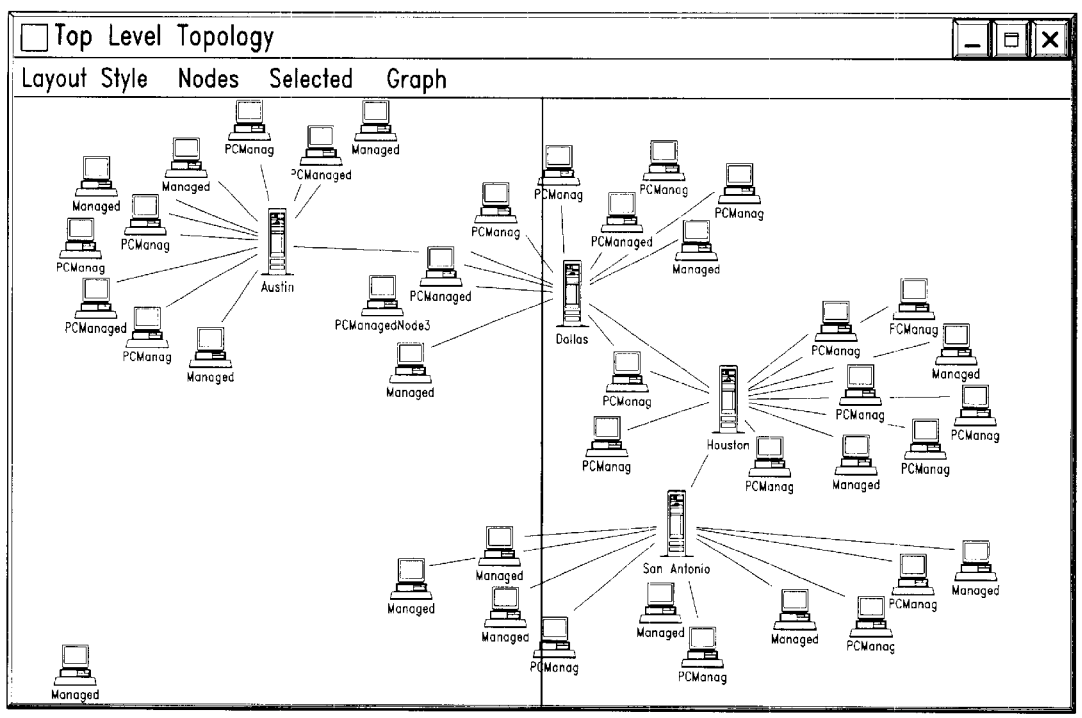
FIG. 9 is a representation of a topology map generated and displayed according to the prior art.
Figure 10:
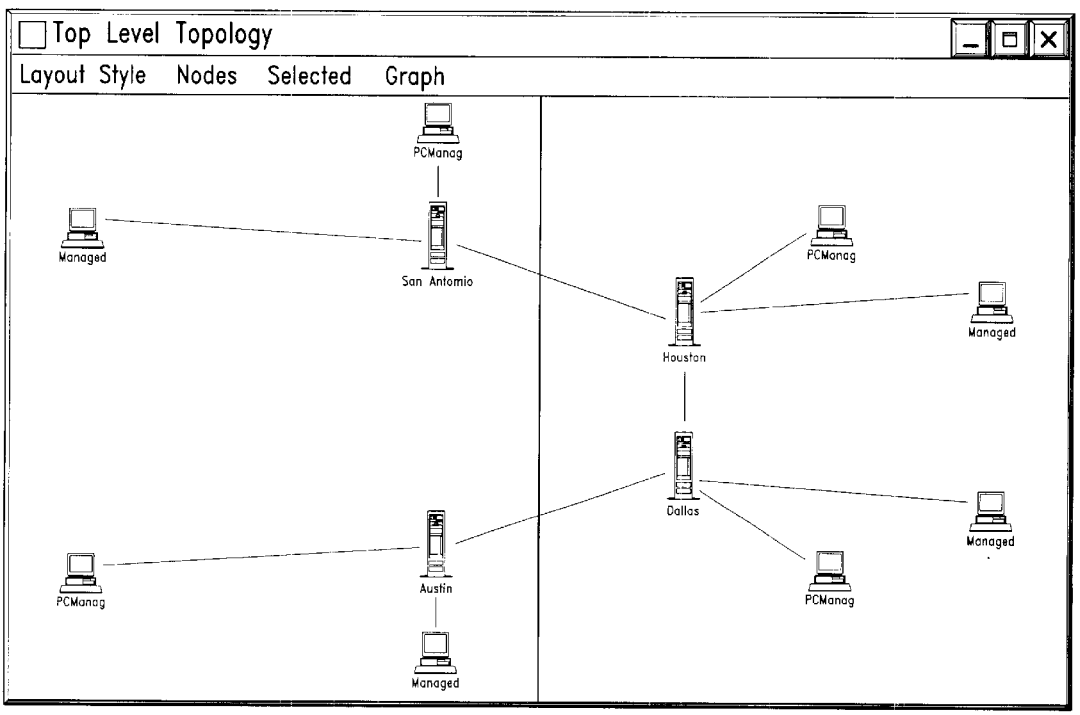
FIG. 10 is a representation of the topology map of FIG. 9 that is generated and displayed according to the display method of the present invention.

The invention thus enables the generation and display of a network topology map wherein a given icon of the map represents network objects of like attributes or attribute values. The technique provides a mechanism to represent a large number, e.g., 250, managed resources with a relatively small number, e.g., up to 10, of symbols per managed region server. FIG. 9 represents a conventional managed region (MR) display map generated according to the prior art. As can be seen, a large number of endpoint machines are represented. FIG. 10 illustrates how this MR display map appears when generated according to the present invention. In this example, the system administrator has elected to display the managed region according to the "by gateway" display rule. As can be seen, this map includes just a small number of icons. It is thus much easier to read and interpret as compared to its predecessor (the map in FIG. 9). As a by-product, software deployment into the managed region may be more readily planned and implemented. One convenient method for deploying software using the topology map is described in Ser. No. 09/089,964, titled "Drag and Drop Technique For Distributing Visual Builder Built Tasks in a Computer Network", assigned to the assignee of the present invention. That application is incorporated herein by reference.

Figure 12:
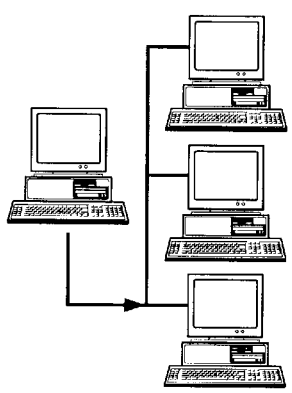
FIG. 12 is an alternative representation of a group icon.
Figure 11:
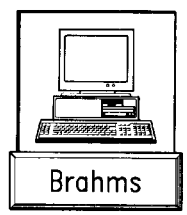
FIG. 11 is a representative group icon.

As seen in FIG. 10, the large number of endpoint icons attached to each gateway has been reduced to a single icon. In this example, this icon includes a text tag "PCManag" to reflect that a set of endpoints is being managed. Thus, preferably the "group" icon representing a number of objects includes a representation (e.g., numeric, textual and/or symbolic) that identifies its status as a such. The actual information provided with the icon (whether by text, numbers or graphics) may be customized using conventional interface tools. Thus, for example, FIG. 11 illustrates a representative text icon, and FIG. 12 illustrates a representative symbolic icon. One of ordinary skill will appreciate that a combination of the two representations may be used. Although not illustrated, it is desirable to display such icons as 3-dimensional (namely, with some perceived "depth" when viewed on a conventional video display). There are many available 3-D paint programs that can be used for this purpose.

The mapper function as previously described also includes a routine for expanding the topology map according to a given user action. Thus, for example, if the user selects the group symbol, e.g., by clicking, the map may be opened up to show all the symbols represented by the group. In addition, to the extent necessary, the rendering software also selectively redraws the remainder of the map to accommodate the expanded set of objects. These functions are supported by known GUI display routines.

The present invention provides several advantages over the prior art. According to the invention, a user (e.g., a system administrator) may view as an icon, in real-time, a set of network objects. This provides a powerful network management planning tool, especially with respect to file deployment.

The objects of this invention are achieved in a large distributed enterprise that includes computing resources organized into one or more managed regions, each region being managed by a management server servicing one or more gateway machines, with each gateway machine servicing a plurality of endpoint machines. As has been illustrated and described, a system management framework is preferably "distributed" on the gateway machines and the one or more endpoint machines to carry out system management tasks. Although the above environment is preferred, one of ordinary skill will appreciate that the inventive concepts may be implemented in smaller distributed client server network environments. Thus, the invention should not be construed to be limited to a particular large scale, distributed computing environment as described in the preferred embodiment.

One of the preferred implementations of the invention is as a set of instructions in a code module resident in the random access memory of a computer. Several of the disclosed functions as described above take advantage of existing display routines. Until required by the computer, the set of instructions may be stored in another computer memory, for example, in a hard disk drive, or in a removable memory such as an optical disk (for eventual use in a CD ROM) or floppy disk (for eventual use in a floppy disk drive), or even downloaded via the Internet.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, although the invention has been described in terms of a preferred embodiment in a specific network environment, those skilled in the art will recognize that the invention can be practiced, with modification, in other and different network architectures with the spirit and scope of the appended claims. Moreover, the inventive diagnostic technique should be useful in any distributed network environment.

Having thus described our invention, what we claim as new and desire to secure by letters patent is set forth in the following claims.

What is claimed is:

1. A method for displaying a network topology on a display device of a computer, comprising the steps of:
   presenting a set of attributes for network objects in the network;
   identifying an attribute and an attribute value according to user input; and
   displaying, as a single icon in the network topology, network objects that have the attribute value for the attribute.

2. The method as described in claim 1 wherein the user selects a plurality of network objects to be displayed as a single icon in the network topology.

3. The method as described in claim 2 wherein a display rule is used to select network objects with like attributes to be displayed as a single icon.

4. The method as described in claim 3 wherein the display rule groups network objects according to a physical characteristic.

5. The method as described in claim 3 wherein the display rule groups network objects according to a logical characteristic.

6. The method as described in claim 1 further including a step of discovering attribute values for network objects prior to the displaying step.

7. The method as described in claim 1 wherein the network topology represents a computer network comprising a managed region in which a set of endpoint computers is managed.

8. The method as described in claim 1 wherein the single icon is displayed in a given manner to identify the network objects represented thereby.

9. The method as described in claim 8 wherein the given manner is a 3-dimensional representation.

10. A display method executable in a computer system having a processor and a display device, comprising steps executable in the processor for:
    compiling information about given characteristics of a computer network;
    using such information to generate a network topology map; and
    responsive to a user-selected display rule, rendering the network topology map on the display device in real-time, with a given icon representing a grouping of network objects.

11. The display method as described in claim 10 wherein the given icon is displayed in a predetermined manner to identify the grouping of network objects represented thereby.

12. The display method as described in claim 11 wherein the given icon is displayed in a 3-dimensional representation.

13. The display method as described in claim 10 wherein the information is compiled using a discovery mechanism.

14. A task deployment planning method in a distributed computer environment, comprising the steps of:
    discovering attribute values of a plurality of network objects;
    storing the attribute values in a database; and
    in response to a user-selectable grouping, building and displaying a topology map for use in planning the task deployment.

15. A task deployment method in a distributed computer environment, comprising the steps of:
    discovering attribute values of a plurality of network objects;
    storing the attribute values in a database; and
    in response to a user-selectable grouping, building a topology map;
    displaying the topology map; and
    using the topology map to deploy the task.

16. A computer program product in a computer-readable medium for use in controlling a display device of a computer, comprising:
    means for presenting a user with a set of attributes for network objects in the network;
    means for enabling the user to select an attribute and an attribute value; and
    means responsive to the selecting means for generating and displaying on the display device, as a single icon in the network topology, network objects that have the attribute value for the attribute.

17. The computer program product as described in claim 16 further including means for enabling the user to define a display rule to be used for selecting network objects with like attributes to be displayed as a single icon.

18. The computer program product as described in claim 17 wherein the display rule groups network objects according to a physical characteristic.

19. The computer program product as described in claim 17 wherein the display rule groups network objects according to a logical characteristic.

20. A computer program product in a computer-readable medium for use in controlling a display device of a computer, comprising:
    means for compiling information about given characteristics of a computer network;
    means for using such information to generate a network topology map; and
    means responsive to entry of a user-selected display rule for rendering, in real-time, the network topology map on the display device with a given icon representing a grouping of network objects.

* * * * *